United States Patent [19]
Getzin

[11] 3,941,571
[45] Mar. 2, 1976

[54] FILTER PLEAT FOLD SPACER

[75] Inventor: Allan R. Getzin, Louisville, Ky.

[73] Assignee: American Air Filter Company, Inc., Louisville, Ky.

[22] Filed: Apr. 7, 1975

[21] Appl. No.: 565,528

[52] U.S. Cl. ............... 55/500; 55/501; 55/521; 428/136; 428/182
[51] Int. Cl.² ............................................ B01D 46/52
[58] Field of Search ........................... 55/499–501, 55/521; 210/493; 428/136, 176, 182

[56] References Cited
UNITED STATES PATENTS

| | | |
|---|---|---|
| 2,397,415 | 3/1946 | Ghez et al. .......................... 428/136 |
| 3,242,655 | 3/1966 | Rivers ................................. 55/500 |
| 3,302,796 | 2/1967 | Downey ............................ 55/500 X |
| 3,696,592 | 10/1972 | Engleman ........................... 55/500 |
| 3,883,331 | 5/1975 | Bernard et al. ................... 55/500 X |

*Primary Examiner*—Frank W. Lutter
*Assistant Examiner*—Kathleen J. Prunner
*Attorney, Agent, or Firm*—Jon C. Winger

[57] ABSTRACT

A filter pleat fold spacer for use in a gas filter device of the type having a flow-through filter frame and a pleated filter media disposed within the frame to hold the pleats of the filter media apart when subjected to the flow of gas to be filtered, the pleat spacer being formed to provide a yieldable surface adjacent the pleat fold turns of the media.

6 Claims, 4 Drawing Figures

U.S. Patent   March 2, 1976   3,941,571
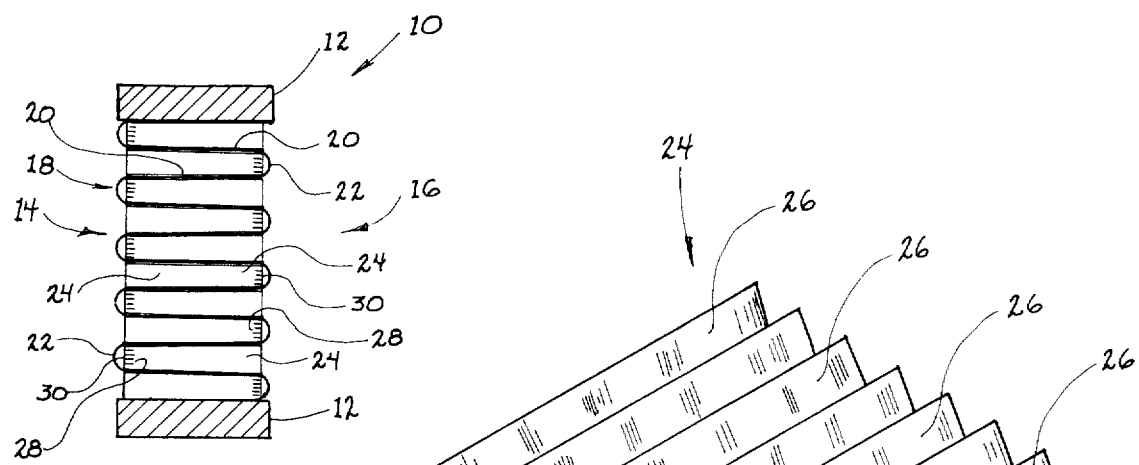
Fig 1
Fig 2
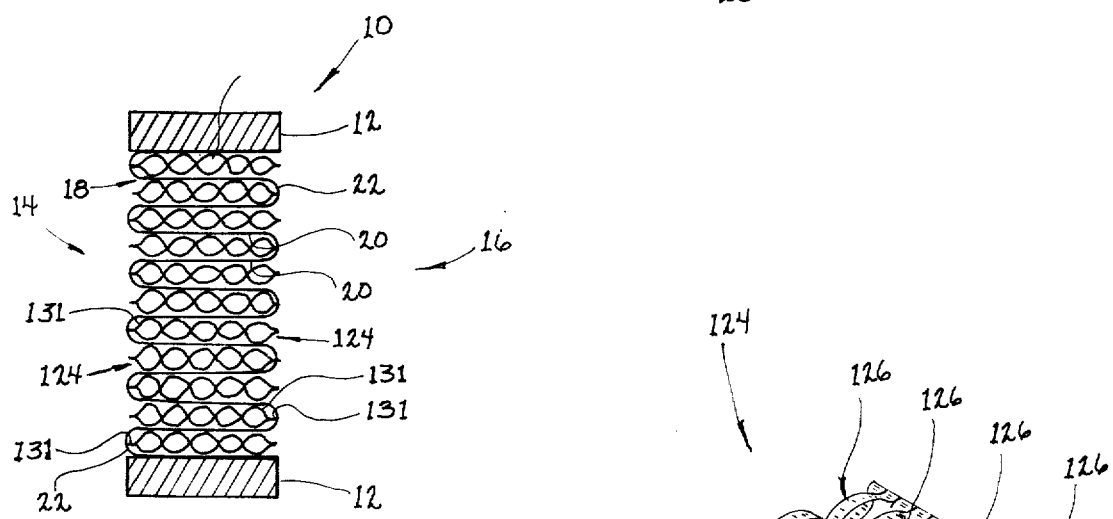
Fig 4
Fig 3

FILTER PLEAT FOLD SPACER

BACKGROUND OF THE INVENTION

The present invention relates to filters having pleated-type filter media, and more particularly, to a pleat fold spacer for holding the pleats of the filter media apart.

Filters having a filter core of pleated filter material are well known in the art. It is also well known in the art that the flanks of the pleats be separated by corrugated spacer members extending into the pleats between the flanks from opposite sides of the filter core to prevent collapse of the filter core and provide gas passages to the extended filtering surfaces.

A drawback of the heretofore known corrugated spacer members has been the inherent tearing stresses which they place on the filter media at the pleat fold turns which form the pleats of the media.

SUMMARY OF THE INVENTION

The present invention recognizes this drawback of the prior art, and provides for a pleat fold spacer for use in a gas filter device of the type having an open ended flow-through frame and a pleated filter media having alternating pleat fold turns disposed in said frame to filter a gas as it passes therethrough, the pleat spacer comprising a plurality of generally parallel reduplicating corrugations and a yieldable surface along at least one edge of said spacer, which surface is to be disposed adjacent the pleat fold turns of the pleated media.

DESCRIPTION OF THE DRAWINGS

A better understanding of the present invention will be had upon reference to the accompanying drawings like numerals refer to like parts throughout the several views and in which:

FIG. 1 is a sectional view through a filter device having a pleat fold spacer of the present invention installed therein;

FIG. 2 is an isometric view of one embodiment of the pleat fold spacer installed in the filter device of FIG. 1;

FIG. 3 is an isometric view of another embodiment of the pleat spacer of the present invention; and, FIG. 4 is a sectional view of a filter device having the pleat spacer illustrated in FIG. 3 disposed therein.

DESCRIPTION OF THE PREFERRED EMBODIMENT

Referring to FIG. 1, there is illustrated a gas filter device of the type which includes an open ended rectangular flow-through housing 12 having an upstream dirty gas inlet 14 and a downstream clean gas outlet 16. Disposed within the housing 12 and sized to extend fully across the filter housing opening is a pleated filter media generally denoted as 18 comprised of a continuous strip of filter media folded back and forth upon itself at longitudinally spaced intervals to provide a plurality of spaced apart pleats 20 with successively alternating pleat fold turns 22. It is to be understood that any one of a number of known filter materials can be utilized for the filter media.

A novel generally rectangular corrugated pleat fold spacer member 24 is disposed between each pair of pleats 20 to extend along the length of the pleat flanks in order to space the flanks of pleats 20 and maintain them in an open or extended position to accommodate the dirty gas stream to be treated.

With continued reference to FIG. 1, and with additional reference to FIG. 2, the pleat spacer 24 is comprised of a plurality of generally parallel reduplicating corrugations 26 and a yieldable surface 27 comprising a plurality of slits 28 formed along and open to the edge 30 of the spacer, which edge is generally perpendicular to the longitudinal axis of the corrugations. The yieldable surface 27 will be adjacently disposed to a pleat fold turn 22 when the spacer 24 is inserted between a pair of pleats 20 as can be seen in FIG. 1.

The slits 28 are illustrated as being generally parallel to each other and generally perpendicular to the edge 30 although they could also be disposed at an obtuse angle to the edge 30 and at an acute angle to each other without deleterious results to their function.

FIG. 3 illustrates another construction of a generally rectangular pleat fold spacer of the present invention, generally denoted as 124, formed of an openwork material, such as, for example, an expanded material. The term expanded material refers to an openwork sheet material, usually of metal, formed by cutting a plurality of short parallel slots through a sheet material and pulling the slotted sheet material in a transverse direction to the axis of the slots, thus, opening the slots to form an array of elongated double pointed apertures. The spacer 124 comprises a plurality of generally parallel reduplicating corrugations 126 which result in rows of adjacently disposed bulbous formations 131 being formed in the openwork material. The spacer 124 further comprises a plurality of slits 128 formed along and open to the edge 130 of the spacer 124, which edge is generally perpendicular to the longitudinal axis of the corrugations. While the slits 128 are illustrated as being generally perpendicular to the edge 130, they could also be disposed at an obtuse angle to the edge 130 and at an acute angle to each other without deleterious effects to their function. The slits 128 and row of bulbous formations adjacent the edge 130 comprise a yieldable surface 127 of the spacer 124, which yieldable surface 127 will be adjacently disposed to a pleat fold turn 22 when the spacer 124 is inserted between a pair of pleats 20 as can be seen in FIG. 4. In addition to providing the yieldable surface 127, this construction is additionally advantageous for the reason that the other rows of bulbous formations 131 formed by the corrugations 126 present a rounded profile to the flanks of the filter media pleats 20.

With reference to FIG. 4, there is shown the filter device 10 having the pleat spacer 124 disposed between the flanks of adjacent pleats 20 such that the yieldable surface 127 comprised of the edge 130 and bulbous configurations 131 is in juxtaposition to the pleat fold turns 22.

The yieldable surfaces 27 and 127 of the spacers 24 and 124, respectively, are what may be termed weak points of the spacer and deform or bend somewhat to conform with the contour of the pleat fold turns, thereby relieving tearing stresses which would otherwise be imparted to the filter media at the pleat fold turns.

The spacers 24 and 124 may be made of any suitable material, and it is to be understood that the choice of material does not comprise part of the present invention. However, a thin foil of aluminum has been found to be a practical material.

The foregoing detailed description is given primarily for clearness of understanding and no unnecessary limitations should be understood therefrom for modifications will be obvious to those skilled in the art upon reading this disclosure and may be made without departing from the spirit of the invention or the scope of the appended claims.

What is claimed is:

1. A filter comprising: a pleated filter media; a plurality of pleat fold spacers inserted between the flanks of the pleated filter media to hold the pleats of the filter media apart; each spacer comprising a plurality of generally parallel reduplicating corrugations and a yieldable surface along at least one edge of said spacer disposed adjacent the pleat fold turns of the pleated filter media; said yieldable surface comprising means defining a plurality of slits at spaced intervals along and open at one end to said edge of said spacer.

2. The filter defined in claim 1, wherein said slits are generally parallel to each other.

3. The filter defined in claim 1, wherein said slits are generally perpendicular to said one edge of said spacer.

4. The filter defined in claim 1, wherein said yieldable surface further comprises a row of bulbous formations proximately disposed to said one edge of said spacer.

5. The filter defined in claim 4, wherein said spacer is of an openwork construction.

6. The filter defined in claim 4, wherein said reduplicating corrugations form a plurality of rows of bulbous formations extending over the entire surface of said spacer.

* * * * *